United States Patent
Boyce et al.

(10) Patent No.: US 9,009,073 B1
(45) Date of Patent: Apr. 14, 2015

(54) PRODUCT AVAILABILITY CHECK USING IMAGE PROCESSING

(71) Applicants: Nicholas Boyce, Miami, FL (US); Guido Carvajal, Miami, FL (US)

(72) Inventors: Nicholas Boyce, Miami, FL (US); Guido Carvajal, Miami, FL (US)

( * ) Notice: Subject to any disclaimer, the term of this patent is extended or adjusted under 35 U.S.C. 154(b) by 0 days.

(21) Appl. No.: 14/560,616

(22) Filed: Dec. 4, 2014

(51) Int. Cl.
*G06Q 30/00* (2012.01)
*G06Q 10/00* (2012.01)
*G06Q 10/08* (2012.01)
*G06F 17/27* (2006.01)

(52) U.S. Cl.
CPC .............. *G06Q 10/087* (2013.01); *G06F 17/27* (2013.01)

(58) Field of Classification Search
CPC combination set(s) only.
See application file for complete search history.

(56) References Cited

U.S. PATENT DOCUMENTS

| | | | |
|---|---|---|---|
| 2002/0165801 A1* | 11/2002 | Stern et al. | 705/27 |
| 2005/0010494 A1* | 1/2005 | Mourad et al. | 705/26 |
| 2005/0160014 A1* | 7/2005 | Moss et al. | 705/26 |
| 2010/0205550 A1* | 8/2010 | Chen et al. | 715/760 |

* cited by examiner

*Primary Examiner* — Ariel Yu
(74) *Attorney, Agent, or Firm* — Mark Terry (57) ABSTRACT

A server for monitoring product availability at a retailer of products provided by a distributor is disclosed. The method includes storing a product list that defines products the distributor provides to the retailer, receiving a current document image that represents products currently sold by the retailer, performing a text recognition process on the current document image, accessing text of a previously dated document image associated with the retailer, detecting differences between the document images, determining whether one or more of said differences pertain to the product list, and if so, then assigning an accuracy value to said one or more differences, and if the accuracy value is greater than a predefined threshold, transmitting an alert to a user, wherein the alert includes a text of one or more differences.

18 Claims, 4 Drawing Sheets

PRODUCT AVAILABILITY CHECK USING IMAGE PROCESSING

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to product distribution and sales and, more specifically, to the automated checking of product availability for use in product distribution and sales.

BACKGROUND

The distribution of products involves supplying goods to stores and other businesses that sell to consumers. In North America alone, the distribution industry is a $900 billion per year industry that accounts for over 1 million jobs and almost 100,000 businesses. Key to the distribution process is a sales process whereby stores and businesses are persuaded, often by a sales representative, to sell certain products in the store. Once a product is being sold by a store, such as on a store shelf or on a restaurant menu, the distribution process involves a continuing relationship with the store or business whereby the distributor supplies the store with the required number of products and addresses related customer requests. This ongoing relationship with the store or business is extremely valuable to the distributor, as it represents a revenue stream.

In light of the enormous value placed on earning a customer's loyalty, distributors expend enormous amounts of time and resources every year to insure that its customers continue selling its products. In the wine and liquor distribution business, for example, sales representatives typically visit their customers (which comprise bars, restaurants, etc.) and review their customers' product lists (such as menus, wine lists or the like) to determine whether the customer is still selling their product. This data gathering step allows the distributor to adjust its sales approach based on its findings. The data gathering process, however, is fraught with problems.

It can be time consuming for a data gathering sales representative to identify the product the distributor was, or is currently, selling to the customer and then to determine if the customer is still selling the distributor's product. This problem is compounded in cases whether the distributor is selling large numbers of different products to the customer and/or the customer's product list is especially large. Another data point that can be gathered is a comparison to a previous product list from the same customer. This will yield additional data about what products the customer was and is selling, which can be used to adjust a distributor's sales approach. Again, this involves a side-by-side visual comparison that can be tedious for an individual to accomplish. Lastly, the data gathering step is prone to human errors that can lead to lack of credibility or authenticity of the resulting data, thereby calling into question the usability of the gathered data.

Moreover, the collection of any relevant data regarding products managed by a distributor can aid the supply chain management process. A supply chain is a system of organizations, people, activities, information, and resources involved in moving a product or service from supplier to distributor, to retailer and, eventually, to the consumer. Supply chain activities are aided by the use of statistics and information regarding availability of products, the location of products, costs and fees, and the current demand for products among retailers and consumers.

Therefore, a dire need exists for improvements over the prior art, and more particularly, there is a need for an automated method and system for checking the availability of products at stores and businesses serviced by a distributor.

SUMMARY

According to the aspects illustrated herein, a method on a server for monitoring product availability at a retailer of products provided by a distributor is disclosed. The method includes: a) receiving, over a communications network, a product list and storing the product list in a record associated with the retailer, wherein the product list defines products the distributor provides to the retailer; b) receiving, over the communications network, a current document image associated with the retailer, wherein the current document image represents products currently sold by the retailer, and storing the current document image in the record associated with the retailer; c) performing a text recognition process on the current document image and storing the resulting text in the record associated with the retailer; d) accessing text of a previously dated document image associated with the retailer; e) detecting differences between the text of the current document image and the text of the previously dated document image; f) determining whether one or more of said differences pertain to the product list associated with the retailer; and g) if one or more of said differences pertain to the product list, then: i) assigning an accuracy value to said one or more differences, wherein the accuracy value is based on a temporal proximity of a time of the current document image to a current time, and on a geographical proximity of a location at which the current document image was taken to a location of the retailer; and ii) if the accuracy value is greater than a predefined threshold, transmitting, over the communications network, an alert to a user, wherein the alert includes a text of one or more differences.

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, the system for monitoring product availability at a retailer of products provided by a distributor overcomes shortcomings of the prior art by providing a consolidated method and system that provides automated, cost-effective, and accurate monitoring of product availability at a retailer of products provided by a distributor. The disclosed embodiments reduce or eliminate the amount of time required by a sales representative to identify the product(s) the distributor was, or is currently, selling to the customer and also reduce or eliminate the amount of time required by a sales representative to determine whether the customer is still selling the distributor's product(s). The disclosed embodiments are further scalable in that the system and method can quickly (as in real-time) and accurately recall large numbers of different products sold to a customer and quickly and accurately check large customer product lists to determine if the customer is still selling the distributor's products. The disclosed embodiments can further rapidly and precisely compare previous customer product lists to current customer product lists and determine which of the distributor's products are or are no longer sold by the customer. The quick provision of this data to the sales representative can be used to quickly adjust a distributor's sales approach, such as in cases where a customer drops a distributor's products from its product list. Also, the disclosed embodiments reduce or eliminate human error from the step of gathering product list data, thereby increasing the usability of the gathered data. Lastly, data regarding products a retailer is currently selling can facilitate the supply chain management process.

Figure 1:
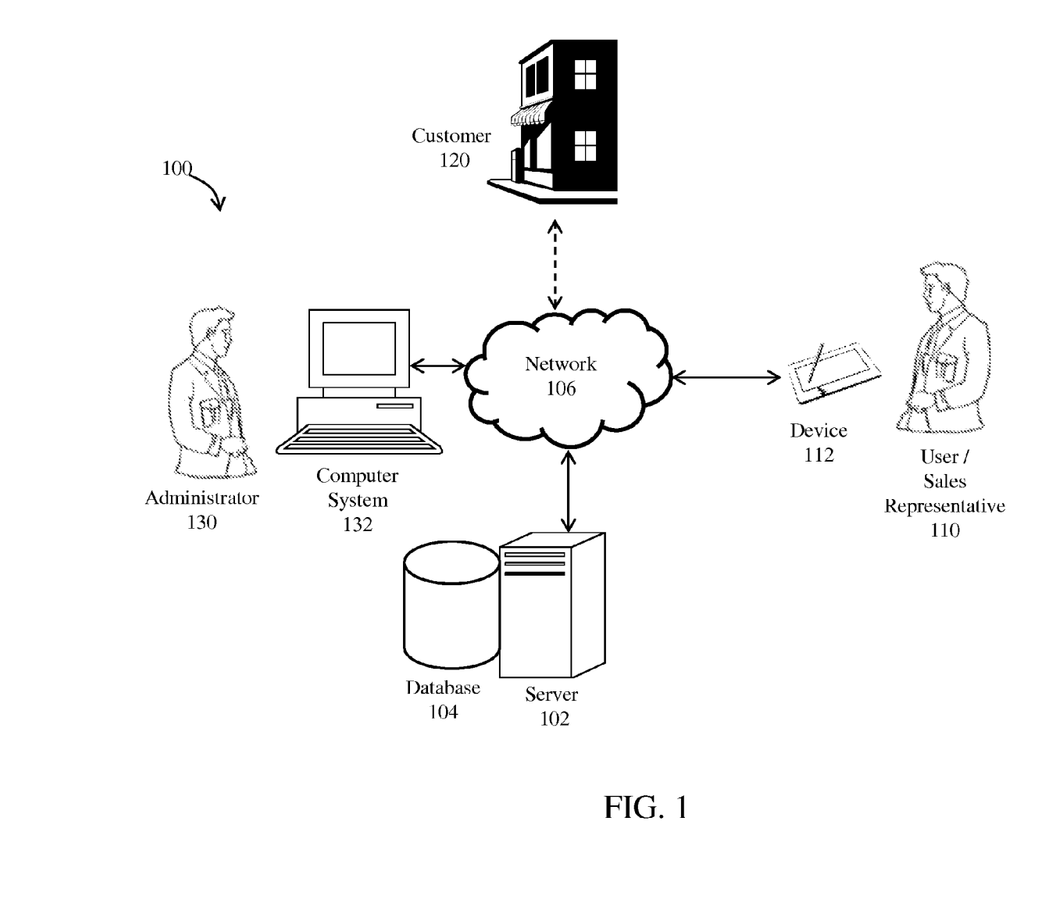
FIG. 1 is a schematic block diagram of an operating environment of an exemplary disclosed embodiment.

Referring now to the drawing figures in which like reference designators refer to like elements, there is shown in FIG. 1 a block diagram of an operating environment 100 of a system for automatically monitoring product availability at a retailer of products provided by a distributor, in accordance to an example embodiment. A prominent element of FIG. 1 is the server 102 associated with a data repository or server-side database 104 and further coupled with network 106, which can be a circuit switched network, such as the Public Service Telephone Network (PSTN), or a packet switched network, such as the Internet or the World Wide Web, the global telephone network, a cellular network, a mobile communications network, a WAN, a LAN, or any combination of the above.

The server 102 may represent a server operated or controlled/contracted by a distributor in a standard distributor-retailer relationship with retailer or customer 120, wherein the customer 120 sells the distributor's products. Sales representative or user 110, as well as administrator 130, may be associated with the distributor associated with the server 102.

Server 102 collects and manages data from the device 112 of user 110 and the computer system 132 of administrator 130 and further manages the server-side database 104, which holds data that is provided or generated by user 110, customer 120, server 102 and administrator 130. In one example, server 102 performs the functions of the disclosed embodiment (i.e., automatically monitoring product availability at a retailer of products provided by a distributor) on a contract basis for the distributor.

FIG. 1 further includes computing devices 112 and 132, which may be a desktop computer, a server, a common computer terminal or mobile computing devices such as smart phones, mobile phones, tablet computers, handheld computers, laptops, any one or more of the above, or the like. The server-side database 104 is one or more data storage devices that may, for example, be a relational database comprising a Structured Query Language (SQL) database stored in a SQL server. Server-side database 104 may be distributed over one or more nodes or locations that are connected via network 106.

Server 102 includes a software engine that delivers applications, data, program code and other information to other computing devices, such as device 112, via the network 106. Server 102 thereby includes program logic comprising computer source code, scripting language code (otherwise referred to as a script) or interpreted language code that may be compiled to produce an executable file or computer instructions, or that may be interpreted at run-time, wherein the computer source code performs various functions of the disclosed embodiments. Note that although server 102 is shown as a single and independent entity, in one exemplary embodiment, the functions of server 102 may be integrated with another entity, such as entities 112, 120, 132. Further, server 102 and its functionality, according to a preferred embodiment, can be realized in a centralized fashion in one computer system or in a distributed fashion wherein different elements are spread across several interconnected computer systems.

It should be noted that although FIG. 1 shows only one server 102, one computer system 132, one customer 120 and one client computing device 112, the system of the disclosed embodiments supports any number of servers, computer systems, customers and client computing devices connected via network 106.

The database 104 may include a user record for each user 110 or 130. A user record may include: a unique identifier for the user, contact/identifying information for the user (name, address, telephone number(s), email address, date of birth, social security number, a photo, etc.), a user address identifier (such as an email address, text message address, social media handle, mobile phone number, etc.), etc. A user record may also include the current location of each user (based on location-based services from the user's mobile computer) and demographic data for each user, such as age, sex, income data, race, color, marital status, etc. Lastly, the user record may include a list of all product lists updated by the user, a list of all document images uploaded by the user, any data related to document images (as described below), a list of all accuracy values assigned to document images uploaded by the user, a combined accuracy value representing all accuracy values assigned to document images uploaded by the user, and a value representing the frequency at which the user has previously submitted a document image that was assigned a low accuracy value (wherein lower frequency has a higher value). User records may include links or references to retailer records and document image records.

The database 104 may also include a retailer record for each customer 120. A retailer record may include contact/identifying information for the retailer (name, address, telephone number(s), email address, etc.), a geographic location for the customer, contact/identifying information for a contact person at the retailer (name, address, telephone number(s), email address, date of birth, social security number, a photo, etc.), and a unique identifier for each customer.

Also, the retailer record may include a group of product lists uploaded by an administrator or user for said retailer, a list of all document images uploaded by a user for the retailer, any data related to document images (as described below) for said retailer, a list of all accuracy values assigned to document images uploaded for the retailer, a combined accuracy value representing all accuracy values assigned to document images uploaded for the retailer, a value representing the frequency at which document images uploaded for the retailer were assigned a low accuracy value (wherein lower frequency has a higher value), a value representing a volume of users that have taken a document image for said retailer (wherein higher volume has a higher value), a value representing a frequency at which differences have been detected between a current document image and a previously dated document image for said retailer (wherein lower frequency has a higher value), and a value representing a frequency at which differences detected between a current document image and a previously dated document image for said retailer have been consistent with previous differences detected (wherein higher frequency has a higher value). Retailer records may include links or references to user records and document image records.

The database 104 may include a document image for each document image. The record may include the document image itself. The document image record may also include a unique identifier and metadata about the document image, such as an image format indicator, image codecs, the resolution of the file, etc. The document image record may also include text recognized from the document image, a temporal proximity of a time of the document image to a current time (wherein higher proximity has a higher value), and a geographical proximity of a location at which the document image was taken to a location of the retailer associated with said document image (wherein higher proximity has a higher value). Document image records may include links or references to user records and retailer records.

Figure 2:
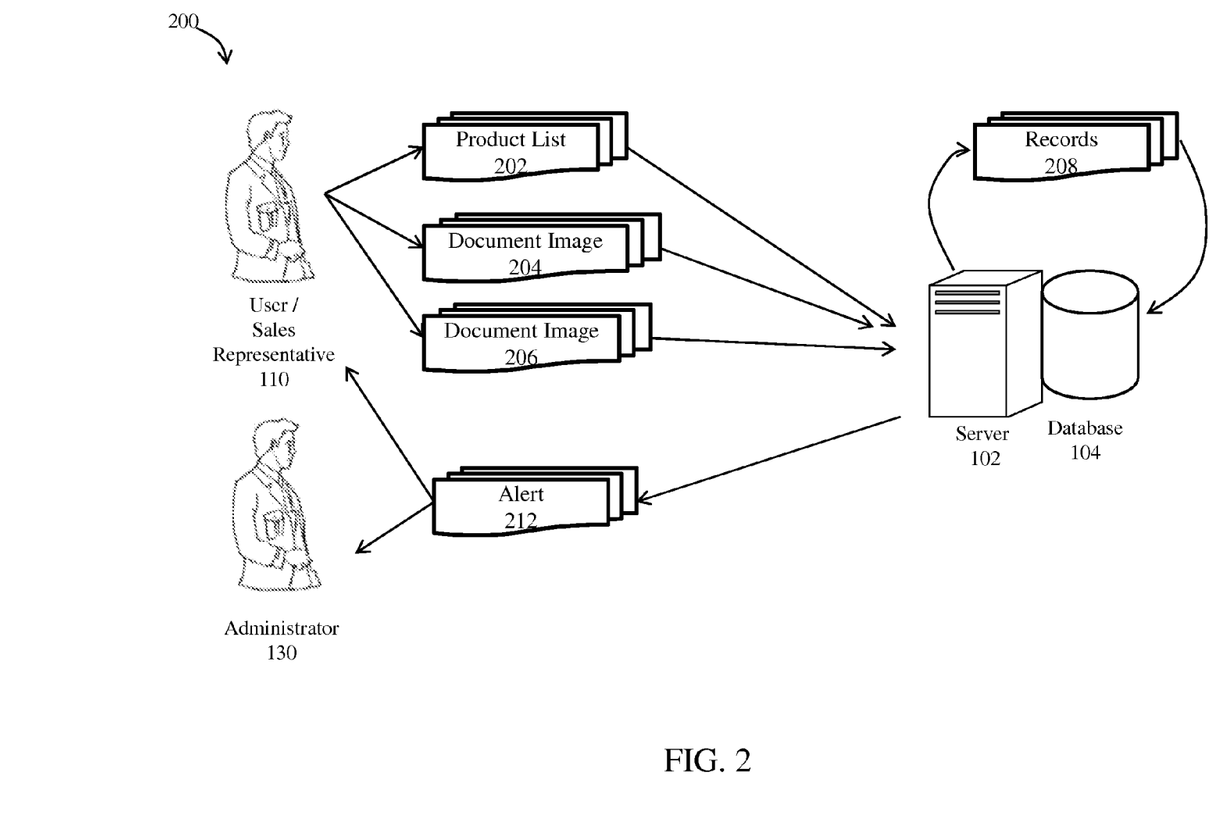
FIG. 2 is a block diagram showing data flow during the process for monitoring product availability at a retailer of products provided by a distributor, according to one embodiment.
Figure 3:
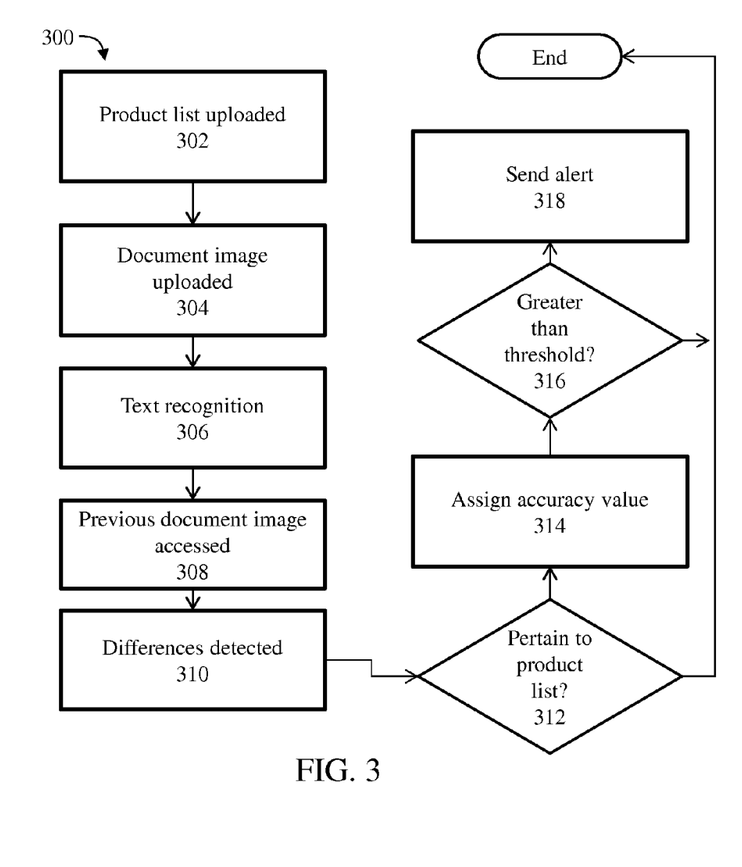
FIG. 3 is a flow chart depicting the general control flow of a process for monitoring product availability at a retailer of products provided by a distributor, according to one embodiment.

The process for automatically monitoring product availability at a retailer of products provided by a distributor will now be described with reference to FIGS. 2 and 3. In step 302, the server 102 receives a product list 202 that defines products the distributor provides to the retailer 120. The user 110 may send the list 202 over network 106 to the server 102 using his device 112 or the customer 120 may send the list 202 over network 106 to the server 102. Server 102 may provide a graphical user interface for the user 110 or administrator 130 to enter or select the list 202 for sending or uploading to server 102. Alternatively, the list may be available in another location or format (such as in a database format on database 104) and server 102 may obtain the list on its own. Also in step 302, the server 102 stores the product list in the database 104 in a record 208 associated with the retailer 120 and/or in a record 208 associated with the user 110 or administrator 130.

The product list 202 may be a list of unique identifiers for products the distributor provides to the retailer, and may include additional data such a timestamp on the list, identifiers for other users (such as administrator 130) associated with the list, a time period of effectiveness of the list, a number of products associated with each product on the list, an SKU for each product on the list, a number of products sold each time period to the customer for each product on the list, etc.

In step 304, the server 102 receives a current document image 206 that defines the products the retailer 120 is currently selling. The image 206 may be of a document that lists the retailer's products, such as a menu, a wine list, an advertisement, etc. The user 110 may send the current document image 206 over network 106 to the server 102 using his device 112 or the customer 120 may send the current document image 206 over network 106 to the server 102. Server 102 may provide a graphical user interface for the user 110 or administrator 130 to enter or select the current document image 206 for sending or uploading to server 102. Alternatively, the current document image 206 may be available in another location or format (such as on the Internet) and server 102 may obtain the current document image 206 on its own. Also in step 304, the server 102 stores the current document image 206 in the database 104 in a record 208 associated with the retailer 120 and/or in a record 208 associated with the user 110 or administrator 130.

The current document image 206 may include a timestamp, a time when the image was taken, a geographical location indicating a location identifying where the image was taken, and other metadata. The current document image 206 may be in a common image format such as JPEG or PNG or in a common document format such as PDF. At the time of step 304, the server 102 may also calculate a value representing a geographical proximity of a location at which the current document image was taken to a location of the retailer, wherein higher proximity has a higher value.

In optional step 306, the server 102 performs a text recognition process (such as Optical Character Recognition) on the current document image 206 and stores the resulting text in the record associated with the retailer 120 and/or in a record associated with the user 110 or administrator 130. In step 308, the server 102 accesses, in database 104, the text of a previously dated document image 204 associated with the retailer 120 in database 104. For example, the server 102 may access the most recent previously dated document image 204 associated with the retailer 120 in database 104.

In step 310, the server 102 detects differences between the text of the current document image 206 and the text of the previously dated document image 204. In step 312, the server 102 determines whether one or more of said differences pertain to the product list 202 associated with the retailer 120. That is, the server 102 determines whether any changes detected in the product list 202 pertain to any of the products that the distributor was or is selling to the retailer 120. If the server 102 determines that none of the differences pertain to the product list 202, then the control flow ends.

The information gathered in step 312 is important to the distributor-retailer relationship and can be used by the distributor to modify its sales approach towards the retailer 120. For example, if one of the distributor's products has been dropped by the retailer, this will affect the distributor's orders and revenue. Thus, the distributor can approach the retailer to find out why the product has been dropped, addresses any problems and potentially pitch other products to the retailer. In another example, if one of the distributor's products has been replaced by the retailer with a competitor's product, this will also affect the distributor's orders and revenue. Thus, the distributor can approach the retailer to find out why the competitor's product is preferable over the distributor's product, and potentially make changes to its products or its product lineup in order to address this issue.

Before step 314, the server 102 may also calculate a value representing a temporal proximity of a time of the current document image to a current time, wherein higher proximity has a higher value. Also, before step 314, the following values may have been previously calculated by server 102: a value representing a volume of users that have taken a document image for said retailer, wherein higher volume has a higher value, a value representing a frequency at which differences have been detected between a current document image and a previously dated document image for said retailer, wherein lower frequency has a higher value, a value representing a frequency at which the user has previously submitted a document image that was assigned a low accuracy value, wherein lower frequency has a higher value, and a value representing a frequency at which differences detected between a current document image and a previously dated document image for said retailer have been consistent with previous differences detected, wherein higher frequency has a higher value.

In step 314, if one or more of said differences pertain to the product list, then the server 102 assigns an accuracy value to said one or more differences. In one embodiment, the accuracy value X assigned to said one or more differences is calculated as:

$$X = AS_A I_A + BS_B I_B + CS_C I_C + DS_D I_D + ES_E I_E + FS_F I_F$$

wherein,

A is a value representing a temporal proximity of a time of the current document image to a current time, wherein higher proximity has a higher value;

$S_A$ is a value representing a level of accuracy of A, wherein higher accuracy has a higher value;

$I_A$ is a constant value representing a weight attributed to A;

B is a value representing a geographical proximity of a location at which the current document image was taken to a location of the retailer, wherein higher proximity has a higher value;

$S_B$ is a value representing a level of accuracy of B, wherein higher accuracy has a higher value;

$I_B$ is a constant value representing a weight attributed to B;

C is a value representing a volume of users that have taken a document image for said retailer, wherein higher volume has a higher value;

$S_C$ is a value representing a level of accuracy of C, wherein higher accuracy has a higher value;

$I_C$ is a constant value representing a weight attributed to C;

D is a value representing a frequency at which differences have been detected between a current document image and a previously dated document image for said retailer, wherein lower frequency has a higher value;

$S_D$ is a value representing a level of accuracy of D, wherein higher accuracy has a higher value;

$I_D$ is a constant value representing a weight attributed to D;

E is a value representing a frequency at which the user has previously submitted a document image that was assigned a low accuracy value, wherein lower frequency has a higher value;

$S_E$ is a value representing a level of accuracy of E, wherein higher accuracy has a higher value;

$I_E$ is a constant value representing a weight attributed to E;

F is a value representing a frequency at which differences detected between a current document image and a previously dated document image for said retailer have been consistent with previous differences detected, wherein higher frequency has a higher value;

$S_F$ is a value representing a level of accuracy of F, wherein higher accuracy has a higher value; and $I_F$ is a constant value representing a weight attributed to F.

In one embodiment, the constant values $I_A$, $I_B$, $I_C$, $I_D$, $I_E$, and $I_F$ are set by an individual, such as administrator 130, and stored in the database 104 for use during step 314. The constant values $I_A$, $I_B$, $I_C$, $I_D$, $I_E$, and $I_F$ are weights that are set in such a way to give more or less importance to each value A, B, C, D, E, and F in the calculation of the accuracy value X. In another embodiment, the values $S_A$, $S_B$, $S_C$, $S_D$, $S_E$, and $S_F$ are also set by an individual, such as administrator 130, and stored in the database 104 for use during step 314. The values $S_A$, $S_B$, $S_C$, $S_D$, $S_E$, and $S_F$ are set according to historical accuracy rates of respective values A, B, C, D, E, and F. Alternatively, the values $S_A$, $S_B$, $S_C$, $S_D$, $S_E$, and $S_F$ may be set when each individual data point is uploaded or calculated. For example, the value $S_B$ may be set when the value B (representing a geographical proximity of a location at which the current document image was taken to a location of the retailer) is calculated. In this example, the value $S_B$ may reflect the accuracy with which a geographical proximity of a location to another location can be calculated by server 102 or another computer.

In step 316, the server 102 determines whether the accuracy value X is greater than a predefined threshold. If so, in step 318 the server 102 transmits, over the communications network 106, an alert to the user 102 or administrator 130, wherein the alert includes a text of one or more differences. The alert may be transmitted via email, text message, or messaging application. In one embodiment, the alert is transmitted using push technology. Push technology describes a style of Internet-based communication where the request for the alert is initiated by the server 102. If the server 102 determines that the accuracy value X is not greater than a predefined threshold, then the control flow ends.

Optionally, after step 318, the following values may be updated by server 102: the value representing a volume of users that have taken a document image for said retailer, the value representing a frequency at which differences have been detected between a current document image and a previously dated document image for said retailer, the value representing a frequency at which the user has previously submitted a document image that was assigned a low accuracy value, and the value representing a frequency at which differences detected between a current document image and a previously dated document image for said retailer have been consistent with previous differences detected.

In one embodiment, the creation of records associated with the retailer, such as in steps 302, 304 and 306, involve the creation of at least 100 records of same. This number of records is significant in the industry because it represents a minimum amount of retailers that is serviced by a median-sized distributor. Likewise, the product list 202 will include at least 50 different products provided by the distributor to the retailer 120. Again, this number of products is significant in the industry because it represents a minimum number of products provided by a median-sized distributor to a typical retailer. The aforementioned number of retailer records and number of products in a product list illustrated the utility of the disclosed embodiments. It is unduly burdensome and extremely time-consuming for a person to categorize a product list, a document image or recognized text in association with a retailer when 100 or more retailers are available in which to categorize. The disclosed embodiments, however, automate this step and free the person (or user 110) from having to perform this step manually. Likewise, it is unduly burdensome and extremely time-consuming for a person to review a document image with 50 or more products and compare said image with a product list of 50 or more products in order to determine whether the underlying document has changed, only with respect to said product list. The disclosed embodiments, however, also automate this step and free the person (or user 110) from having to perform this step manually.

As explained above, the collection of any relevant data regarding products managed by a distributor can aid the supply chain management process. Supply chain management is the systemic, strategic coordination, design, planning, execution, control, and monitoring of supply chain activities with the objective of creating net value, building a competitive infrastructure, leveraging group logistics, synchronizing supply with demand and measuring performance globally. Supply chain management includes management of inventories, distribution, channels, payments, suppliers, transportation and customer service.

More specifically, data regarding products a retailer is currently selling can facilitate the supply chain management process as it provides data about upcoming demand or lack of demand for certain products and allows a manufacturer or distributor (or any provider higher up in a supply chain) to adjust its activities or actions based on said demand data. As such, in one embodiment, data regarding products a retailer is currently selling is just one data point that is collected and acted upon by a distributor in the supply chain management process. In this embodiment, the server 102, which represents the distributor, enters any such data regarding products a retailer is currently selling (such as the data regarding detected differences in step 310, the data regarding whether said differences correspond to a predefined product list in step 312, accuracy values for said data in step 314, and data regarding whether said accuracy values are above a predefined threshold in step 316) into a supply chain management process. In this embodiment, any data regarding products a retailer is currently selling is used to make supply chain management process decisions.

Figure 4:
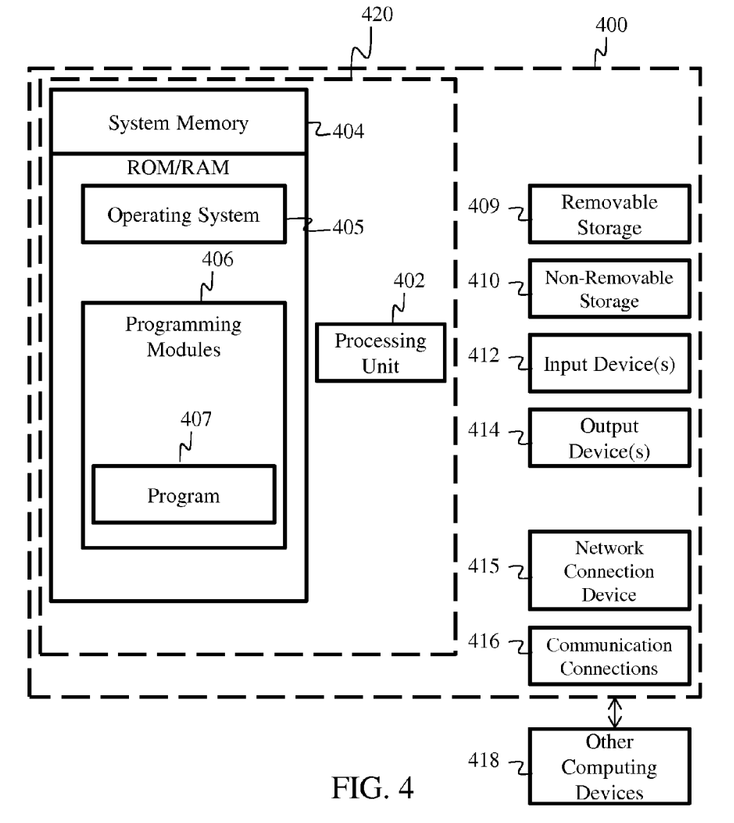
FIG. 4 is a block diagram of a system including an example computing device and other computing devices.

FIG. 4 is a block diagram of a system including an example computing device 400 and other computing devices. Consistent with the embodiments described herein, the aforementioned actions performed by 102, 132, 112 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the methods shown in FIGS. 2-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407, which implements the process of FIG. 3. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

Device 415 may be a network connection device or network interface device (also known as a network interface card, network adapter, LAN adapter, and by similar terms), which is a computer hardware component that connects a computer to a computer network. The network interface device implements the electronic circuitry required to communicate using a specific physical layer and data link layer standard such as Ethernet, Wi-Fi or Token Ring. This provides a base for a full network protocol stack, allowing communication among small groups of computers on the same LAN and large-scale network communications through routable protocols, such as IP.

As stated above, a number of program modules and data files may be stored in system memory 404, including operating system 405. While executing on processing unit 402, programming modules 406 may perform processes including, for example, one or more of the methods shown in FIGS.

2-3 above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the disclosed embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts related to the process for monitoring product availability at a retailer serviced by a distributor, it is to be understood that the subject matter defined in the appended claims is not necessarily limited to the specific features or acts described above. Rather, the specific features and acts described above are disclosed as example forms of implementing the claims directed towards the process for monitoring product availability at a retailer serviced by a distributor.

What is claimed is:

1. A method on a server communicatively coupled to a communications network, the method for monitoring product availability at a retailer of products provided by a distributor, comprising:
   a) receiving, over the communications network, a product list and storing the product list in a record associated with the retailer, wherein the product list defines products the distributor provides to the retailer;
   b) receiving, over the communications network, a current document image associated with the retailer, wherein the current document image represents products currently sold by the retailer, and storing the current document image in the record associated with the retailer;
   c) performing a text recognition process on the current document image and storing the resulting text in the record associated with the retailer;
   d) accessing text of a previously dated document image associated with the retailer;
   e) detecting differences between the text of the current document image and the text of the previously dated document image;
   f) determining whether one or more of said differences pertain to the product list associated with the retailer; and
   g) if one or more of said differences pertain to the product list, then: i) assigning an accuracy value to said one or more differences, wherein the accuracy value is based on a temporal proximity of a time of the current document image to a current time, and on a geographical proximity of a location at which the current document image was taken to a location of the retailer; and ii) if the accuracy value is greater than a predefined threshold, transmitting, over the communications network, an alert to a user, wherein the alert includes a text of one or more differences.

2. The method of claim 1, wherein the step of receiving a product list further comprises receiving a product list that includes a list of unique identifiers for products the distributor provides to the retailer.

3. The method of claim 2, wherein the step of receiving a current document image further comprises receiving a photograph of a written product list.

4. The method of claim 3, wherein the step of receiving a current document image further comprises receiving a photograph of a written product list, wherein said photograph includes a time of taking the photograph and a geographical location where said photograph was taken.

5. The method of claim 3, wherein the step of performing the text recognition process further comprises performing optical character recognition on the current document image.

6. The method of claim 5, wherein the step of accessing text of a previously dated document image associated with the retailer further comprises, accessing text of a most recent previously dated document image associated with the retailer.

7. A method on a server communicatively coupled to a communications network, the method for monitoring product availability at a retailer of products provided by a distributor, comprising:
   a) receiving, over the communications network, a product list and storing the product list in a record associated with the retailer, wherein the product list defines products the distributor provides to the retailer;
   b) receiving, over the communications network, a current document image associated with the retailer and a user, wherein the current document image represents products currently sold by the retailer, and storing the current document image in the record associated with the retailer;
c) performing a text recognition process on the current document image and storing the resulting text in the record associated with the retailer;
d) accessing text of a previously dated document image associated with the retailer;
e) detecting differences between the text of the current document image and the text of the previously dated document image;
f) determining whether one or more of said differences pertain to the product list associated with the retailer; and
g) if one or more of said differences pertain to the product list, then:
  i) assigning an accuracy value to said one or more differences, wherein the accuracy value X is calculated as:

$$X = AS_A I_A + BS_B I_B + CS_C I_C + DS_D I_D + ES_E I_E + FS_F I_F$$

wherein,
A is a value representing a temporal proximity of a time of the current document image to a current time, wherein higher proximity has a higher value;
$S_A$ is a value representing a level of accuracy of A, wherein higher accuracy has a higher value;
$I_A$ is a constant value representing a weight attributed to A;
B is a value representing a geographical proximity of a location at which the current document image was taken to a location of the retailer, wherein higher proximity has a higher value;
$S_B$ is a value representing a level of accuracy of B, wherein higher accuracy has a higher value;
$I_B$ is a constant value representing a weight attributed to B;
C is a value representing a volume of users that have taken a document image for said retailer, wherein higher volume has a higher value;
$S_C$ is a value representing a level of accuracy of C, wherein higher accuracy has a higher value;
$I_C$ is a constant value representing a weight attributed to C;
D is a value representing a frequency at which differences have been detected between a current document image and a previously dated document image for said retailer, wherein lower frequency has a higher value;
$S_D$ is a value representing a level of accuracy of D, wherein higher accuracy has a higher value;
$I_D$ is a constant value representing a weight attributed to D;
E is a value representing a frequency at which the user has previously submitted a document image that was assigned a low accuracy value, wherein lower frequency has a higher value;
$S_E$ is a value representing a level of accuracy of E, wherein higher accuracy has a higher value;
$I_E$ is a constant value representing a weight attributed to E;
F is a value representing a frequency at which differences detected between a current document image and a previously dated document image for said retailer have been consistent with previous differences detected, wherein higher frequency has a higher value;
$S_F$ is a value representing a level of accuracy of F, wherein higher accuracy has a higher value; and
$I_F$ is a constant value representing a weight attributed to F; and
  ii) if the accuracy value is greater than a predefined threshold, transmitting, over the communications network, an alert to the user, wherein the alert includes a text of one or more differences.

8. The method of claim 7, wherein the step of receiving a product list further comprises receiving a product list that includes a list of unique identifiers for products the distributor provides to the retailer.

9. The method of claim 8, wherein the step of receiving a current document image further comprises receiving a photograph of a written product list.

10. The method of claim 9, wherein the step of receiving a current document image further comprises receiving a photograph of a written product list, wherein said photograph includes a time of taking the photograph and a geographical location where said photograph was taken.

11. The method of claim 9, wherein the step of performing the text recognition process further comprises performing optical character recognition on the current document image.

12. The method of claim 11, wherein the step of accessing text of a previously dated document image associated with the retailer further comprises, accessing text of a most recent previously dated document image associated with the retailer.

13. A server for supply chain management, the server comprising:
a database for storing at least 100 records, each associated with a retailer, wherein each record is associated with a product list that defines at least 50 products a distributor provides to a retailer;
a network interface device communicatively coupled with a communications network;
a memory storage; and
a processor communicatively coupled with the database, the network interface device and the memory storage, the processor programmed for:
a) receiving, via the network interface device, a current document image associated with a retailer, wherein the current document image represents at least 50 products currently sold by the retailer, and storing in the database the current document image in the record associated with the retailer;
b) performing, in real time, a text recognition process on the current document image and storing the resulting text in the record associated with the retailer;
c) accessing, in the database in real time, text of a previously dated document image associated with the retailer;
d) detecting, in real time, differences between the text of the current document image and the text of the previously dated document image;
e) determining, in real time, whether one or more of said differences pertain to the product list associated with the retailer; and
f) if one or more of said differences pertain to the product list, then: i) assigning, in real time, an accuracy value to said one or more differences, wherein the accuracy value is based on a temporal proximity of a time of the current document image to a current time, and on a geographical proximity of a location at which the current document image was taken to a location of the retailer; and ii) if the accuracy value is greater than a predefined threshold, transmitting, via the network interface device, in real time, an alert to a user, wherein the alert includes a text of one or more differences.

14. The server of claim 13, wherein the step of receiving a product list further comprises receiving a product list that includes a list of unique identifiers for products the distributor provides to the retailer.

15. The server of claim 14, wherein the step of receiving a current document image further comprises receiving a photograph of a written product list.

16. The server of claim 15, wherein the step of receiving a current document image further comprises receiving a photograph of a written product list, wherein said photograph includes a time of taking the photograph and a geographical location where said photograph was taken.

17. The server of claim 15, wherein the step of performing the text recognition process further comprises performing optical character recognition on the current document image.

18. The server of claim 17, wherein the step of accessing text of a previously dated document image associated with the retailer further comprises, accessing text of a most recent previously dated document image associated with the retailer.

* * * * *